April 9, 1957 F. SCHATTEN ET AL 2,787,947
ELECTRIC BROILER
Filed April 13, 1956 2 Sheets-Sheet 1
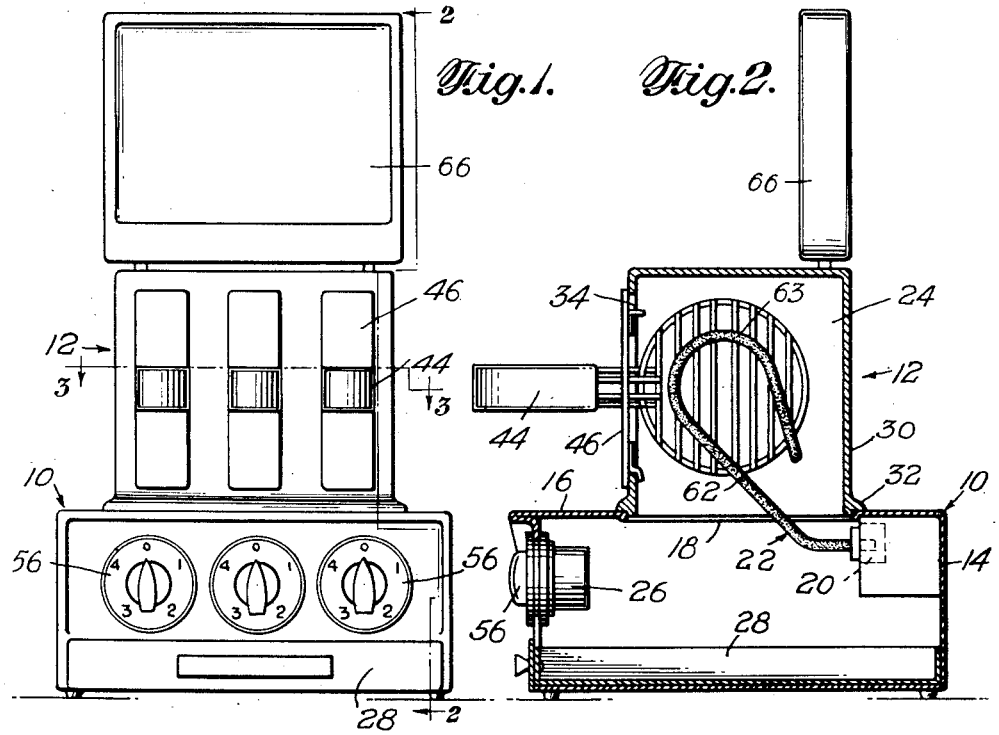
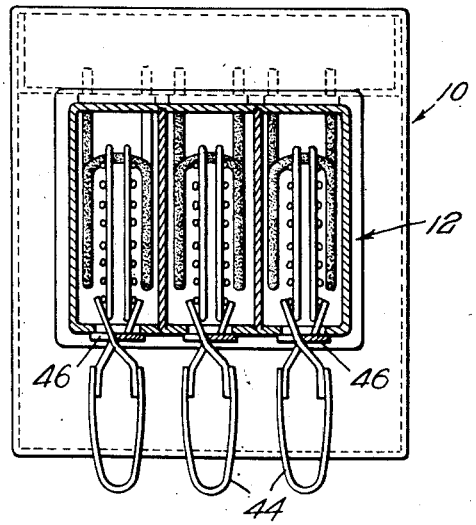
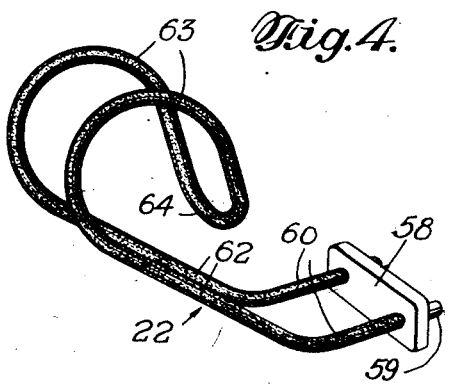
INVENTORS
Frank Schatten and
Thomas Alderdice.
BY Nathan A. Conn
ATTORNEY April 9, 1957  F. SCHATTEN ET AL  2,787,947
ELECTRIC BROILER
Filed April 13, 1956  2 Sheets-Sheet 2

INVENTORS
Frank Schatten
Thomas Alderdice
BY Nathan A. Conn
ATTORNEY

United States Patent Office 2,787,947
Patented Apr. 9, 1957

2,787,947

ELECTRIC BROILER

Frank Schatten, New York, N. Y., and Thomas Alderdice, New Milford, N. J.

Application April 13, 1956, Serial No. 577,968

6 Claims. (Cl. 99—332)

This invention relates to electric broilers, particularly of the type designed to broil hamburgers or other food materials of a similar nature.

One object of the invention is to provide an electric broiler of a type used for broiling hamburgers or like food material, so constructed as to be trouble free in operation and which may be readily and quickly taken apart for cleaning when desired.

Another object is to provide an electric broiler of the vertical type in which the electric connections and timing elements are entirely out of the line of the direction of falling or dripping of any material from the object being broiled, and all areas subject to grease impingement are such as may be thoroughly washed.

A further object is to provide an electric broiler wherein the heating element is of such construction as to be connectable to a plug in the base portion of an enclosing housing, and can extend into the top portion of a separable housing element, to provide a heating loop having two arms between which the material to be broiled may be inserted.

A still further object is to provide an electric broiler of the type mentioned, which is entirely enclosed when in operation so as to eliminate egress of odors emanating from the material being broiled.

A still further object is to provide in a broiler of the above type a removable material holder whereby the material may be grasped and inserted into the broiler with one hand, and when so inserted the opening in the broiler is securely closed by a cover plate on the holder registering with the opening.

The various further objects and advantages of the improved broiler will appear from the following detailed description and the features of novelty will be particularly pointed out in the claims.

In the accompanying drawing, illustrating the invention:

Fig. 1 is a front elevation of the broiler with all of the holders inserted therein;

Fig. 2 is a vertical section taken along line 2—2 of Fig. 1;

Fig. 3 is a horizontal section taken along line 3—3 of Fig. 1;

Fig. 4 is a detail perspective view, illustrating one of the electric heating elements;

Figure 5:
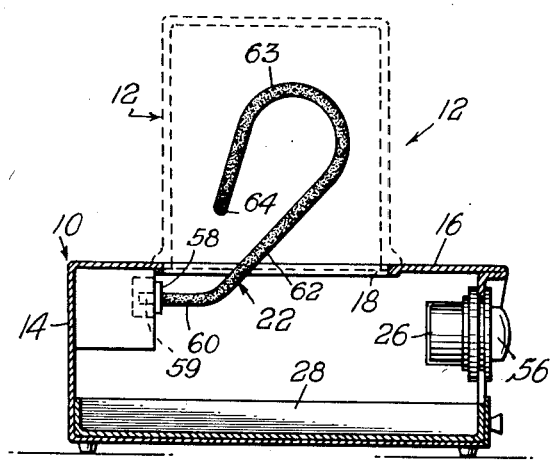
Fig. 5 is a sectional side elevation of the base with the top portion of the housing removed therefrom, but indicated in broken lines.
Figure 6:
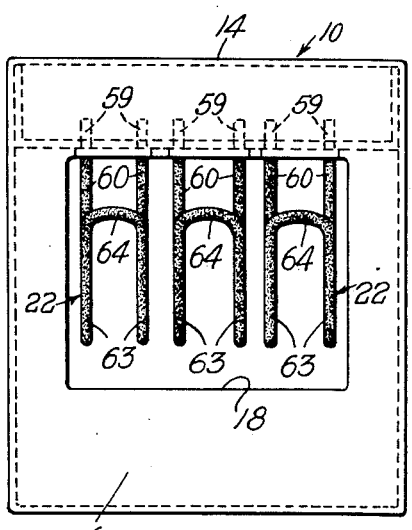
Fig. 6 is a plan view of the base with the top portion removed.

Referring in detail to the drawings, our improved broiler is provided with an enclosing housing, comprising a base portion 10 and a top portion 12 separable therefrom. The base portion is formed with vertical walls 14 and a top wall 16 extending inwardly from walls 14 about a central opening 18, into which the top portion 12 is removably fitted. Electric socket portions 20 are disposed under the rear portion of wall 16, into which sockets electric heating units 22 may be plugged. These units are of such formation as to extend upwardly into the heating chambers 24, formed in the top housing portion 12. Electric current for the heating units and the timing thereof are regulated by timing devices 26 disposed preferably under the front portion of top wall 16 of the base portion. The electric sockets and timing units are thus shielded from any fat or portions of material falling from the material being broiled in broiling chambers 24. A removable drip pan 28 disposed at the bottom of base 10 catches any drippings falling from the material being broiled and may be readily drawn out and cleaned from time to time as may be required.

The top portion 12 of the housing is formed with vertical walls 30 fitting into the opening 18 of top wall 16 of the base member 10, and is provided with a shoulder portion 32 seating about opening 18, whereby the housing top is held firmly in registering position with the base. The front wall of housing portion 12 is formed with vertically extending openings 34, through each of which a holder carrying material to be broiled, such as a hamburger, may be inserted into position in proper register with heating elements 22. These openings 34 are closed by the insertion of the holder carrying the material to be broiled as follows:

The holder for the material comprises two grid members 36, consisting preferably of wire loops, or circular rings 38, to which is attached a series of parallel, spaced wires 40. To these wires and rings are attached preferably pairs of crossed wires 42, 43, the opposite extremities of these wires being respectively attached to the extremities of a bowed spring handle 44, formed of leaf spring material. The spring handle biases the grids into closed position. Thus to grasp the material the operator merely presses prongs of the handle together while holding it in one hand and releases the pressure to permit the spring of the handle 44 to yieldingly hold the material, which may then be inserted through an opening 34 into the heating chamber. The opening 34 of the heating chamber is closed by a closure plate 46 which is attached to the holder by means of the wires 42, which pass through perforations through the closure plate and are welded thereto. The wires 43 pass through slots 48 formed in the adjacent margin of closure plate 46, thus permitting freedom of movement of wires 43 to open and close grids 36 when the spring handle 44 is pressed and released.

Figure 7:
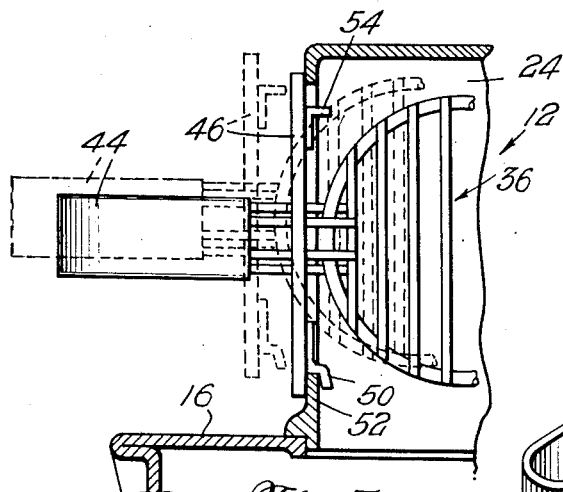
Fig. 7 is a fragmental vertical sectional view, illustrating in broken lines the position of the holder during the act of insertion and removal from the broiler.
Figure 8:
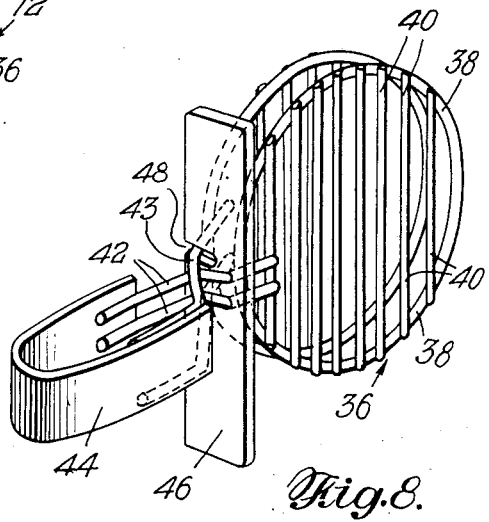
Fig. 8 is a perspective detail view illustrating the holder detached from the broiler.

In order to maintain the closure plate snugly in closing position for closing the opening 34, and at the same time positioning the grids 36 in proper relation to the heating unit, the closure plate 46 is provided on the inner face thereof with a hook member 50 disposed so as to hook over the margin of the bottom portion 52 of the frame about the opening 34. A guiding lug 54 is also attached to the inner surface of closure plate 46 adjacent to the upper extremity thereof to cooperate with the hook 50 in guiding the holder into the proper position when inserted into the heating chamber. As shown in broken lines in Fig. 7, the holder while being inserted is raised to a position wherein the hook clears the lower margin of the opening, then is moved forward so as to pass hook 50 and lug 52 into the opening with the closure plate pressed flush against the housing wall, then the holder is moved downwardly so as to hook member 50 over the margin 52, whereby the holder is held firmly in proper position for closing the opening and for maintaining the grids in proper registry in relation to the heating units.

Any suitable standard timing and control unit may be used for timers 26, so as to regulate the broiling time and give an audible or visual signal when the desired broiling operation is completed. Suitable knobs 56 disposed on the front wall of the base, may be operated to open and close the electric circuit for the individual units and to set the timer for the desired broiling time.

The electric heating unit which we preferably employ, as shown in perspective in Fig. 4, is particularly adapted to promote the easy cleaning of the broiler as may be required from time to time. This heating unit as shown comprises a plug member 58, carrying the usual conducting prongs 59, to which are connected respectively the spaced arms 60 of a loop of a resistance element encased in an electrically non-conducting heat resistant casing, such for example as is known in the trade as "calrod." This material may be readily cleaned and washed without damage. The special formation of the loop of the heating unit enhances the convenience in the protection of the vital portions of the electrical connections from the products of the broiling operation. Thus the plug element 60 connects into socket 20 disposed in the base underneath the protecting cover of top portion 16. The arms 60 of the heating loop extend upwards at 62 to enter the heating chamber 24 of the top housing portion 12, then curve rearwardly at 63 and finally come together at 64, thus completing the loop. The spacing of the arms at 62, 63 provides ample space for the insertion of the holder grids 36 therebetween and at the same time provide ample heat radiating surface on both sides of the grid for heating the material thoroughly on both sides thereof.

Figure 9:
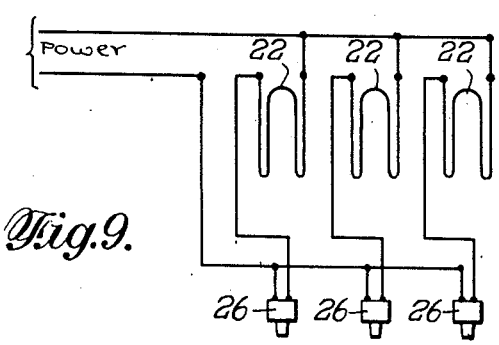
Fig. 9 is a wiring diagram of the electrical connections.

The wiring diagram, illustrated in Fig. 9, clearly shows how each of the heating units is connected to its individual timer and may be controlled separately without interference from the other units. Thus if one customer desires his order done rare, another desires medium done, and still another desires his order well done, the timers may be selectively set for the desired orders without interference of one with another.

A sign board 66 may be mounted on the top of the housing to indicate the type of machine and any desired advertising matter to enhance the attractiveness of the service to the customer.

Having thus described our invention, what we claim and desire to secure by Letters Patent is:

1. In an electric broiler for broiling hamburgers and like food articles containing fats and juices, a completely enclosed housing comprising a base section and a top section freely removably mounted thereon; said base section being formed with vertical walls including a front wall and a horizontal top wall having a substantially central opening therein spaced from said front wall so as to leave a front ledge as a portion of the top wall of said base; said top section of the housing having front, side, rear and top walls of reduced lateral dimensions compared with the corresponding walls of the base section and being open at the bottom to conform to the dimensions of said opening in the top wall of the base section and to fit thereover so as to form a completely enclosed housing; said top section enclosing a plurality of heating chambers provided with individual electric heating units; the front wall of said top section being formed with a plurality of vertically extending openings corresponding to said heating chambers; removable food holders individual to said openings and corresponding heating chambers, each of said holders being provided with grid elements for gripping a hamburger, and also provided with a closure member fitting its corresponding opening to close the same when the holder is inserted into the heating chamber; time control elements for said heating units disposed within said base section and disposed underneath said front ledge away from the vertical line of drip of the juices emanating from the food articles being broiled; removable means at the bottom of the base portion remote from said heating units for catching the drippings dropping from the heating chambers through said central opening into said base portion, and manually settable control knobs disposed on said front wall of said base section for setting said time control elements.

2. In an electric broiler for broiling hamburgers and like food articles containing fats and juices, a completely enclosed housing comprising a base section and a top section freely removably mounted thereon; said base section being formed with vertical walls including a front wall and a horizontal top wall having a substantially central opening therein spaced from said vertical walls so as to leave ledges as portions of said top wall of said base; said top section of the housing having front, side, rear and top walls of reduced lateral dimensions compared with the corresponding walls of the base section to conform to the dimensions of said opening in the top wall of the base section and to fit thereover so as to form a completely enclosed housing; said top section enclosing a plurality of heating chambers provided with individual electric heating units; the front wall of said top section being formed with a plurality of vertically extending openings corresponding to said heating chambers; removable food holders individual to said openings and corresponding heating chambers, each of said holders being provided with a closure member fitting its corresponding opening to close the same when the holder is inserted into the heating chamber; time control elements for said heating units disposed within said base section and disposed underneath said front ledge out of the vertical line of drip of juices dripping from food articles being broiled; said ledges leaving room for electrical connections from said heater units disposed out of line of drip of said food articles being broiled; removable means at the bottom of the base portion remote from said heating units for catching the drippings dropping from the heating chambers through said central opening into said base portion, and manually settable control knobs disposed on said front wall of said base section for setting said time control elements.

3. In an electric broiler for broiling hamburgers and like food articles containing fats and juices, a completely enclosed housing comprising a base section enclosing the electric control elements and a freely removable top section having an open bottom enclosing heating chambers provided with electric heating units therein individual respectively to said heating chambers; said top section being formed with front, side, rear and top walls; said front wall being formed with openings individual to said heating chambers; removable food holders each comprising spring biased grid elements between which food articles may be held; a grip portion on each of said food holders connected to said grid elements whereby said grid elements may be closed and opened with one and the same hand grasping said grip portions for grasping and releasing a food article; and a closure member provided on each grip portion of a size to register with its corresponding opening adapted to close the same when the holder is inserted into its corresponding heating chamber, said closure member being provided with a depending lug member adapted to hook over the adjacent margin of the corresponding opening, said top section and food holders being freely removable to render all surfaces exposed to emanations from the broiling food articles accessible for rapid cleaning.

4. In an electric broiler for broiling hamburgers and like food articles containing fats and juices, a completely enclosed housing comprising a base section and a top section freely removably mounted thereon; said base section being formed with vertical walls including a front wall, side walls, and a horizontal top wall having a substantially central opening therein spaced from said vertical walls so as to leave ledges as portions of said top wall of said base; said top section of the housing having front, side, rear and top walls of reduced lateral dimensions compared with the corresponding walls of the base section to conform to the dimensions of said opening in the top wall of the base section and to fit thereover; said top section enclosing a plurality of heating chambers provided with individual electric heating units; the front wall of said top section being formed with a plurality of vertically extending openings corresponding to said heating chambers; removable food holders individual to said openings and corresponding heating chambers, each of said holders comprising relatively movable grid elements and a closure member fitting its corresponding opening to close the same when the holder is inserted into the heating chamber; time control elements for said heating units disposed within said base section and disposed underneath one of said ledges out of the vertical line of drip of juices dripping from food articles being broiled; said ledges leaving room for electrical connections from said heater units disposed out of line of drip of said food articles being broiled; removable means at the bottom of the base portion remote from said heating units for catching the drippings dropping from the heating chambers through said central opening into said base portion, and manually settable control knobs disposed on a wall of said base section for setting said time control elements.

5. In an electric broiler comprising an electric heating chamber having an apertured vertical wall, a holder for food material to be inserted into said heating chamber, said holder comprising a pair of grids; pairs of spaced crossed wire elements attached at one end to the grids; a spring handle comprising a bowed spring member, to the extremities of which the other ends of said crossed wire elements are respectively connected, said bowed spring member being adapted to hold said grids yieldingly biased toward one another for holding a food article between them and to release said food article when the bowed spring is grasped to compress the same; and a closure member carried by said crossed wire elements, said closure member being of a size to fit said vertical opening so as to close said heating chamber when said holder is inserted into said heating chamber, said closure member being slotted to afford freedom of movement of said crossed wire elements in grasping and releasing food articles between said grids.

6. An electric broiler as defined in claim 5 wherein said bowed spring member is of the leaf spring type affording a broad surface for forming a handle having an extended surface for grasping and compressing the same.

References Cited in the file of this patent
UNITED STATES PATENTS

| | | |
|---|---|---|
| 456,275 | McMillan | July 21, 1891 |
| 1,116,442 | Kirkwood | Nov. 10, 1914 |
| 1,228,956 | Noonan | June 5, 1917 |
| 1,394,450 | Strite | Oct. 18, 1921 |
| 1,425,344 | Schwartz | Aug. 8, 1922 |
| 1,717,592 | Wheelock | June 18, 1929 |
| 1,809,172 | Le Sauvage | June 9, 1931 |
| 1,809,867 | Rittenberger | June 16, 1931 |
| 1,951,677 | Pavelka | Mar. 20, 1934 |
| 1,955,867 | Wilkie et al. | Apr. 24, 1934 |
| 2,030,047 | Bonzagni et al. | Feb. 11, 1936 |
| 2,069,824 | Engel et al. | Feb. 9, 1937 |
| 2,634,749 | Cone | Apr. 14, 1953 |
| 2,707,428 | Netreba | May 3, 1955 |

OTHER REFERENCES

Electric Heaters and Heating Devices, General Electric Co., Schenectady, N. Y., GED-650B, December 1941 (pages 4–15).